(12) United States Patent
Agrawal et al.

(10) Patent No.: US 12,405,124 B2
(45) Date of Patent: Sep. 2, 2025

(54) DIGITAL TWIN SIMULATION FOR TRANSPORTATION

(71) Applicant: International Business Machines Corporation, Armonk, NY (US)

(72) Inventors: Tushar Agrawal, West Fargo, ND (US); Jeremy R. Fox, Georgetown, TX (US); Atul Mene, Morrisville, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 17/476,676

(22) Filed: Sep. 16, 2021

(65) Prior Publication Data

US 2023/0077570 A1 Mar. 16, 2023

(51) Int. Cl.
*G01C 21/34* (2006.01)
*G01C 21/36* (2006.01)

(52) U.S. Cl.
CPC ..... *G01C 21/3484* (2013.01); *G01C 21/3438* (2013.01); *G01C 21/3461* (2013.01); *G01C 21/3617* (2013.01)

(58) Field of Classification Search
CPC ............ G01C 21/3484; G01C 21/3438; G01C 21/3461; G01C 21/3617
See application file for complete search history.

(56) References Cited

U.S. PATENT DOCUMENTS

| 8,756,090 | B2 | 6/2014 | Benda |
| 9,958,272 | B2 | 5/2018 | Morris, IV |
| 10,860,015 | B2 | 12/2020 | Ferguson |
| 2015/0317589 | A1 | 11/2015 | Anderson |
| 2017/0185822 | A1 | 6/2017 | Gibbon |
| 2018/0247266 | A1 | 8/2018 | Knapp |
| 2018/0281657 | A1* | 10/2018 | Healey ................. G06Q 10/08 |
| 2020/0057988 | A1 | 2/2020 | Streebin |
| 2020/0249047 | A1* | 8/2020 | Balva ................. G01C 21/3438 |
| 2021/0133670 | A1 | 5/2021 | Cella |

(Continued)

OTHER PUBLICATIONS

T. Ambra and C. Macharis, "Agent-Based Digital Twins (ABM-Dt) In Synchromodal Transport and Logistics: the Fusion of Virtual and Pysical Spaces," 2020 Winter Simulation Conference (WSC), Orlando, FL, USA, 2020, pp. 159-169, doi: 10.1109/WSC48552.2020. 9383955 (Agent-Based_Digital_Twins.pdf) (Year: 2020).*

(Continued)

*Primary Examiner* — Anne Marie Antonucci
*Assistant Examiner* — Patrick M Brady
(74) *Attorney, Agent, or Firm* — Yee & Associates, P.C.

(57) ABSTRACT

A processor may receive first object data associated with a first object to be transported. The processor may receive vehicle data associated with one or more potential vehicles for transportation of the first object. The processor may receive context data associated with a context for the transportation of the first object. The processor may simulate the transportation of the first object utilizing each of the one or more potential vehicles using digital twin simulation. The processor may select a first vehicle of the one or more potential vehicles based on an optimization of an optimization factor associated with an outcome of the digital twin simulation.

11 Claims, 5 Drawing Sheets

(56) References Cited

U.S. PATENT DOCUMENTS

| | | | | |
|---|---|---|---|---|
| 2022/0318691 | A1* | 10/2022 | Ammar | G06Q 10/02 |
| 2023/0088950 | A1* | 3/2023 | Tadeu de Paula | G06Q 10/06315 |
| 2023/0113298 | A1* | 4/2023 | Marczuk | G08G 1/22 701/27 |

OTHER PUBLICATIONS

Anonymous. "Build smarter supply chains with AI and blockchain." Printed Sep. 16, 2021. 10 pages. Published by IBM. https://www.ibm.com/supply-chain.

Anonymous. "IBM Digital Twin Exchange." Printed Jul. 7, 2021. 7 pages. Published by IBM. https://www.ibm.com/products/digital-twin-exchange.

Anonymous. "Order management software and solutions." Printed Sep. 16, 2021. 14 pages. Published by IBM. https://www.ibm.com/supply-chain/order-management.

Anonymous. "Supply chains are changing. Here are 5 things we know now." Printed Jul. 7, 2021. 3 pages. Published by IBM. https://www.ibm.com/watson/supply-chain/resources/five-things-we-know-about-supply-chains/.

Anonymous. "What is order management?" Printed Jul. 7, 2021. 20 pages. Published by IBM. https://www.ibm.com/topics/order-management.

Hauge, et al., "Employing Digital Twins within Production Logistics." Published in 2020. 8 pages. In 2020 IEEE International Conference on Engineering, Technology and Innovation (ICE/ITMC). Published by IEEE.

Mell, et al., "The NIST Definition of Cloud Computing," Recommendations of the National Institute of Standards and Technology, U.S. Department of Commerce, Special Publication 800-145, Sep. 2011, 7 pgs.

* cited by examiner

DIGITAL TWIN SIMULATION FOR TRANSPORTATION

BACKGROUND

The present disclosure relates generally to the field of digital twin simulation, and more specifically to digital twin simulation of transportation of an object.

A digital twin is a virtual representation of an object or system that spans its lifecycle, is updated from real-time data, and uses simulation, machine learning and reasoning to help decision-making.

SUMMARY

Embodiments of the present disclosure include a method, computer program product, and system for digital twin simulation of transportation of an object.

A processor may receive first object data associated with a first object to be transported. The processor may receive vehicle data associated with one or more potential vehicles for transportation of the first object. The processor may receive context data associated with a context for the transportation of the first object. The processor may simulate the transportation of the first object utilizing each of the one or more potential vehicles using digital twin simulation. The processor may select a first vehicle of the one or more potential vehicles based on an optimization of an optimization factor associated with an outcome of the digital twin simulation.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
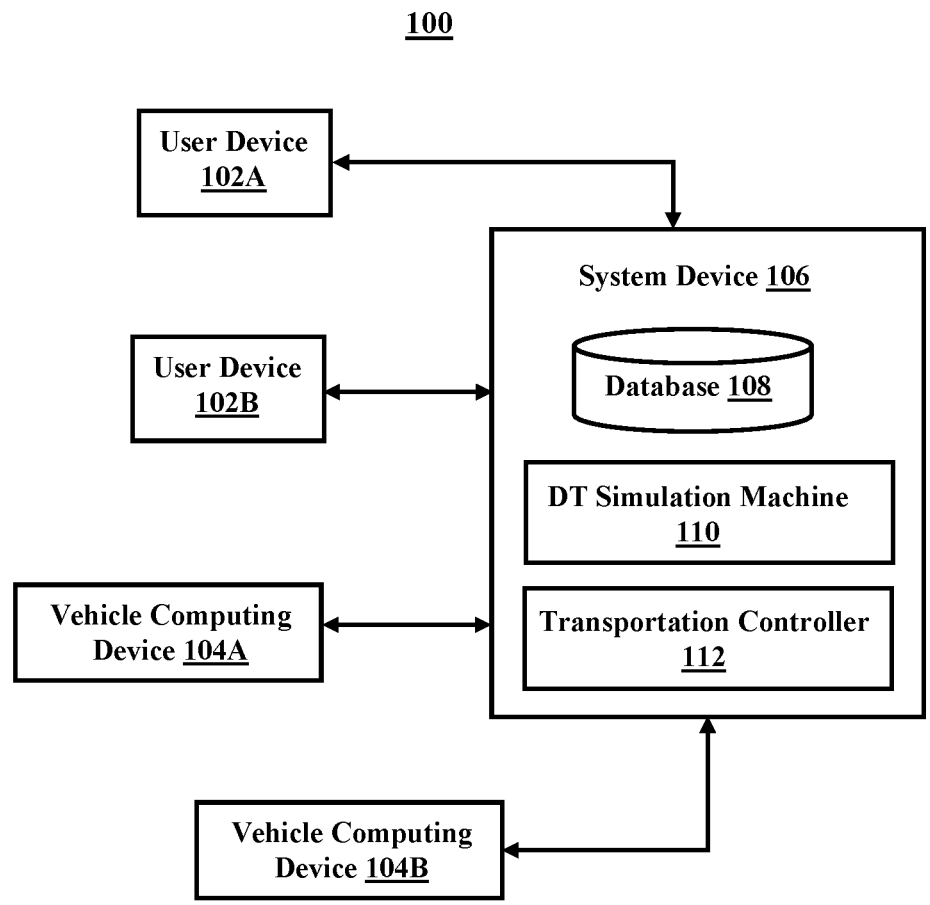
FIG. 1 is a block diagram of an exemplary system for digital twin simulation of transportation of an object, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of digital twin simulation, and more specifically to digital twin simulation of transportation of an object. While the present disclosure is not necessarily limited to such applications, various aspects of the disclosure may be appreciated through a discussion of various examples using this context.

In some embodiments, a processor may receive object data associated with an object to be transported. In some embodiments, the object data may relate to factors associated with the object related to the transportation of the object. In some embodiments, the object data may be associated with the size of the object, the weight of the object, the shape of the object, or the dimensions of the object. In some embodiments, the object data may be associated with the materials from which the object is made (e.g., fragile or temperature sensitive materials). In some embodiments, the object data may relate to aspects of the packaging or container for the object that may affect the outcome or process of transportation of the object, including packaging/container size, packaging/container weight, packaging/container materials (e.g., waterproof, water absorbent, rigid, flexible, etc.), packaging/container dimensions, etc. In some embodiments, the object data may be received specifically for each object. In some embodiments, the object data may be obtained from historical information stored in a database (e.g., historical information obtained from previous transportation of objects or standard package types). In some embodiments, the object data may include information regarding the route the object is to be transported, including origin and destination locations, conditions likely to be encountered on potential routes between the origin and destination (e.g., inclement weather, constraints associated with potential routes between the origin and destination (e.g., narrow roads), etc.

In some embodiments, the processor may receive vehicle data associated with one or more potential vehicles for transportation of the object. In some embodiments, the vehicle data may relate to the type of vehicle used to transport the object from its origin to its destination. As non-limiting examples, the vehicle may include a motorcycle, bicycle, drone, truck, three-wheeled motor vehicle, an autonomous vehicle, a boat, or any other device suitable for movement over land, air, or water and conveyance of the object from along the route, or portions of the route, from the origin to destination point.

In some embodiments, the vehicle data may include vehicle specific information regarding the operation, repair, or maintenance of the vehicle. For example, the vehicle data may include information regarding the tire pressure of a vehicle, motor/transmission oil levels of the vehicle (e.g., low transmission oil may make mountainous travel difficult), damage to the vehicle (e.g., a damaged flatbed may carry less weight), repair status of the vehicle (e.g., utilization of a replacement tire may permit the vehicle to carry less weight), fuel economy of the vehicle (e.g., an effect of performance/maintenance of vehicle), carrying capacity of the vehicle, road conditions required for travel (e.g., truck requires wider road), dimensions of vehicle (e.g., height of the vehicle which may relate to overpasses, width of the vehicle which may affect its ability to travel on narrow roads). In some embodiments, the vehicle data may be based on historical information (e.g., historical maintenance information for a category/type of vehicles, etc.).

In some embodiments, the processor may receive context data associated with the context for the transportation of the object. In some embodiments, the context data may relate to background conditions that may be encountered while transporting the object along the route from the origin to the destination. In some embodiments, the context data may relate to the route to be traveled and may include: traffic conditions (e.g., crawling traffic, jammed traffic, speed of traffic flow, volume of traffic, traffic flow patterns, availability of pathways for flow of traffic) and road conditions (e.g., obstructed roads, dirt roads, paved roads, number of traffic lights on a road, state of operation of traffic lights, potholes, low bridges, weight limits, flooding, etc.). In some embodiments, the context data may relate to weather or environmental conditions (e.g., rain, snow, hail, high winds, flooding, high tide, etc.). In some embodiments, the context data may be based on historical information, including historical traffic conditions, historical contextual situations (e.g., bad roads, low weight tolerant bridges, unpredictable rain/flash flooding during a particular time of year), etc.

In some embodiments, the processor may simulate the transportation of the object utilizing each of the one or more potential vehicles using digital twin simulation. In some embodiments, the processor may retrieve a digital twin simulation for a type of vehicle stored in a repository of simulations. In some embodiments, the processor may generate a new digital twin simulation of the vehicle. In some embodiments, the digital twin may simulate the overall condition of the vehicle to provide a simulation of the outcome and conditions associated with transportation of an object from its origin to its destination (e.g., fuel economy of the vehicle during successful travel over the route, halted travel along the route resulting from a breakdown in the vehicle, damage to the object resulting from route conditions, the capabilities of/features of (e.g., type of suspension) the vehicle used for transportation, etc.). In some embodiments, the digital twin may simulate transportation from origin to destination based on location, object details, and background context associated with the transportation (e.g., poor/moderate condition vehicle may not travel long distance without incidence). In some embodiments, the processor may receive information about the outcome of the simulated transportation, including the timeline for delivery, fuel usage, damage or wear to vehicle, status of the transportation task (e.g., successful completion vs. breakdown along the route).

In some embodiments, the processor may select a first vehicle of the one or more potential vehicles based on an optimization of an optimization factor associated with an outcome of the digital twin simulation. In some embodiments, the optimization factor may relate to the timeline of transportation (e.g., fastest), costs associated with the transportation (e.g., fuel, toll, wear and tear on the vehicle), environmental factors (e.g., least fuel consumption), other delivery factors (e.g., use of the same vehicle for multiple deliveries along the same or similar transportation route). In some embodiments, the optimization factor may be selectable from (e.g., by a user or by the processor): transportation cost, transportation time, damage (e.g., from wear and tear) to the vehicle, distance to be traveled, number of objects to be transported along the same route or portion of a route (e.g., lump packages to same locality in one delivery truck to minimize number of miles driven), etc.

In some embodiments, the processor may generate the optimization factor. In some embodiments, generating the optimization factor may include analyzing the digital twin simulation for one or more transportation impacts. In some embodiments, the processor may select at least one of the one or more transportation impacts on which to base the optimization factor. In some embodiments, one or more transportation impacts may include the timeline of transportation of the first object, costs associated with the transportation of the first object, environmental factors associated with the transportation of the first object, damage to vehicles, distance to be traveled, number of objects to be transported along the same route or portion of a route, other delivery factors (e.g., use of fewest vehicles), etc.

In some embodiments, the processor may send a command to a processor associated with the selected vehicle. In some embodiments, the processor may, based on the command, schedule transportation of the object. In some embodiments, the command may be sent to a processor associated with an autonomous vehicle that controls the timing and route of travel of the autonomous vehicle. In some embodiments, the command may be sent to a processor of a device that runs scheduling software that stores information regarding upcoming tasks (e.g., transportation routes and objects), the time of the upcoming tasks, the amount of time required for the completion of the task, reminders regarding the upcoming scheduled task, etc.

In some embodiments, the processor may select a second vehicle of the one or more potential vehicles based on an optimization of the optimization factor associated with a digital twin simulation of the second vehicle transporting the first object. In some embodiments, the processor may determine a first transportation route for the first vehicle and a second transportation route for the second vehicle for the transportation of the object based, at least in part, on the optimization of the optimization factor. In some embodiments, more than one vehicle may be used to transport the object along one or more portions of the transportation route between the origin and destination. In some embodiments, the processor may select the additional vehicles (e.g., second or more) based on optimization of the optimization factor used to select the first vehicle. In some embodiments, the processor may also determine the route that the first vehicle is to transport the object and the route that the second vehicle is to transport the vehicle. In some embodiments, the routes or portions of the route (for transportation of the object by the first and second vehicles) may also selected based on an optimization of the optimization factor. In some embodiments, a command may be sent to a processor associated with the first vehicle and the second vehicle to schedule transportation of the object.

In some embodiments, the processor may receive second object data. In some embodiments, the processor may simulate transportation of the second object. In some embodiments, the simulation may be based on the combination of the constraints associated with the first object data and the second object data. In some embodiments, the processor may select the first vehicle based on a combined optimization factor, where the combined optimization factor combines a set of constraints associated with the first object and a set of constraints associated with the second object. In some embodiments, the constraints associated with the first and/or second object may include: factors associated with the first object related to the transportation of the object, factors associated with the second object related to the transportation of the object, delivery time, delivery location for the first and/or second object, conditions needed for delivery based on both objects (e.g., refrigeration, high care for fragile items), the size of the first object and/or the second object, the weight of the first object and/or the second object, the shape of the first object and/or the second object, or the dimensions of the first object and/or the second object, the materials from which the first object and/or the second object are made, characteristics of the packaging or container for the first object and/or the second object that may affect the outcome or process of transportation of the first object and/or the second object, packaging/container dimensions, the route the first object is to be transported, the route the second object is to be transported, etc.

In some embodiments, the combined optimization factor may include the timeline of transportation of the first object and/or the second object, costs associated with the transportation of the first object and/or the second object, environmental factors associated with the transportation of the first object and/or the second object, damage to vehicles, distance to be traveled, number of objects to be transported along the same route or portion of a route, other delivery factors (e.g., use of fewest vehicles), etc.

In some embodiments, the processor may further determine a first transportation route for the first object and a second transportation route for the second object based, at least in part, on the optimization of the optimization factor. For example, the processor may determine a combined route that passes through the origin location for the first object, the destination location for the first object, the origin location for the second object, and the destination location for the second object. The combined route may include overlapping transportation routes for the first object and the second object which results in a reduction in costs associated with the transportation of the first object and the second object.

Referring now to FIG. 1, a block diagram of a system 100 for digital twin simulation of transportation of an object is illustrated. System 100 includes user devices 102A-B, vehicle computing devices 104A-B, and a system device 106. The user devices 102A-B and vehicle computing devices 104A-B are configured to be in communication with the system device 106. The system device 106 includes a database 108, a digital twin simulation machine 110, and a transportation controller 112. In some embodiments, the user devices 102A-B, vehicle computing devices 104A-B, and a system device 106 may be any devices that contain a processor configured to perform one or more of the functions or steps described in this disclosure.

In some embodiments, first object data associated with a first object to be transported is received from the user device 102A by the system device 106. The system device 106 also receives vehicle data associated with one or more potential vehicles for transportation of the object and context data associated with a context for the transportation of the object. The first object data, vehicle data, and context data may be based, at least in part, on historical data stored in database 108. The first object data, vehicle data, and context data are used by the digital twin simulation machine 110 of the system device 106 to simulate the transportation of the first object utilizing each of the one or more potential vehicles. The transportation controller 112 of the system device 106 is used to select a first vehicle of the one or more potential vehicles based on an optimization of an optimization factor associated with an outcome of the digital twin simulation.

In some embodiments, the transportation controller 112 sends a command to a processor associated with the selected vehicle (e.g., to vehicle computing device 104A) and schedules, based on the command, transportation of the first object.

In some embodiments, the transportation controller 112 may select a second vehicle of the one or more potential vehicles (e.g., to a vehicle in communication with vehicle computing device 104B) based on an optimization of the optimization factor associated with a digital twin simulation of the second vehicle transporting the first object. In some embodiments, the transportation controller 112 may determine a first transportation route for the first vehicle and a second transportation route for the second vehicle for the transportation of the first object based, at least in part, on the optimization of the optimization factor.

In some embodiments, the transportation controller 112 may generate the optimization factor. In some embodiments, the transportation controller 112 may analyze the digital twin simulation for one or more transportation impacts and select at least one of the one or more transportation impacts on which to base the optimization factor.

In some embodiments, the system device 106 may receiving second object data from user device 102B. In some embodiments, the digital twin simulation machine 110 may be used to simulate transportation of the second object, wherein the simulation is based on the combination of the constraints associated with the first object data and the second object data. In some embodiments, the transportation controller 112 may select the first vehicle for transportation of the first object and the second object based on a combined optimization factor. In some embodiments, the combined optimization factor combines a set of constraints associated with the first object and a set of constraints associated with the second object. In some embodiments, the transportation controller 112 may determine a first transportation route for the first object and a second transportation route for the second object based, at least in part, on the optimization of the optimization factor.

Figure 2:
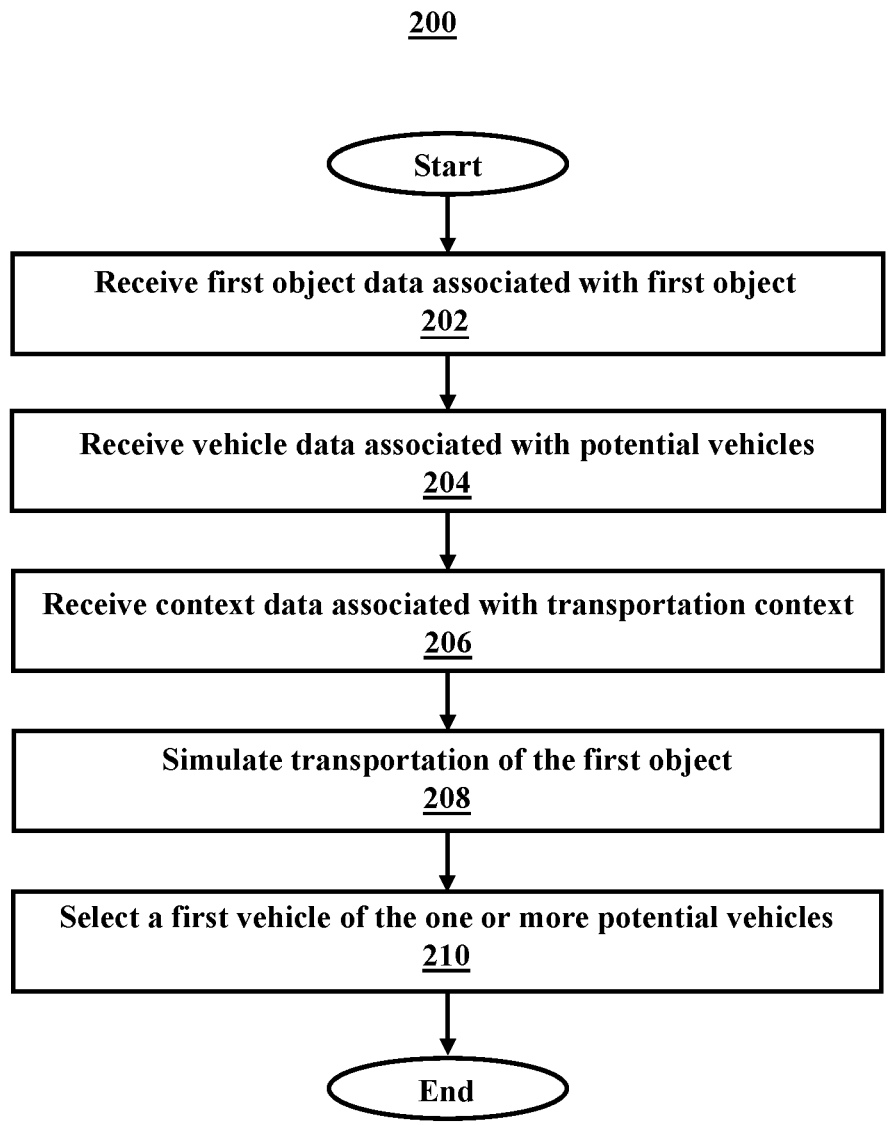
FIG. 2 is a flowchart of an exemplary method system for digital twin simulation of transportation of an object, in accordance with aspects of the present disclosure.

Referring now to FIG. 2, illustrated is a flowchart of an exemplary method 200 for digital twin simulation of transportation of an object, in accordance with embodiments of the present disclosure. In some embodiments, a processor of a system may perform the operations of the method 200. In some embodiments, method 200 begins at operation 202. At operation 202, the processor receives first object data associated with a first object to be transported. In some embodiments, method 200 proceeds to operation 204, where the processor receives vehicle data associated with one or more potential vehicles for transportation of the first object. In some embodiments, method 200 proceeds to operation 206. At operation 206, the processor receives context data associated with a context for the transportation of the first object. In some embodiments, method 200 proceeds to operation 208. At operation 208, the processor simulates the transportation of the object utilizing each of the one or more potential vehicles using digital twin simulation. In some embodiments, method 200 proceeds to operation 210. At operation 210, the processor selects a first vehicle of the one or more potential vehicles based on an optimization of an optimization factor associated with an outcome of the digital twin simulation.

As discussed in more detail herein, it is contemplated that some or all of the operations of the method 200 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
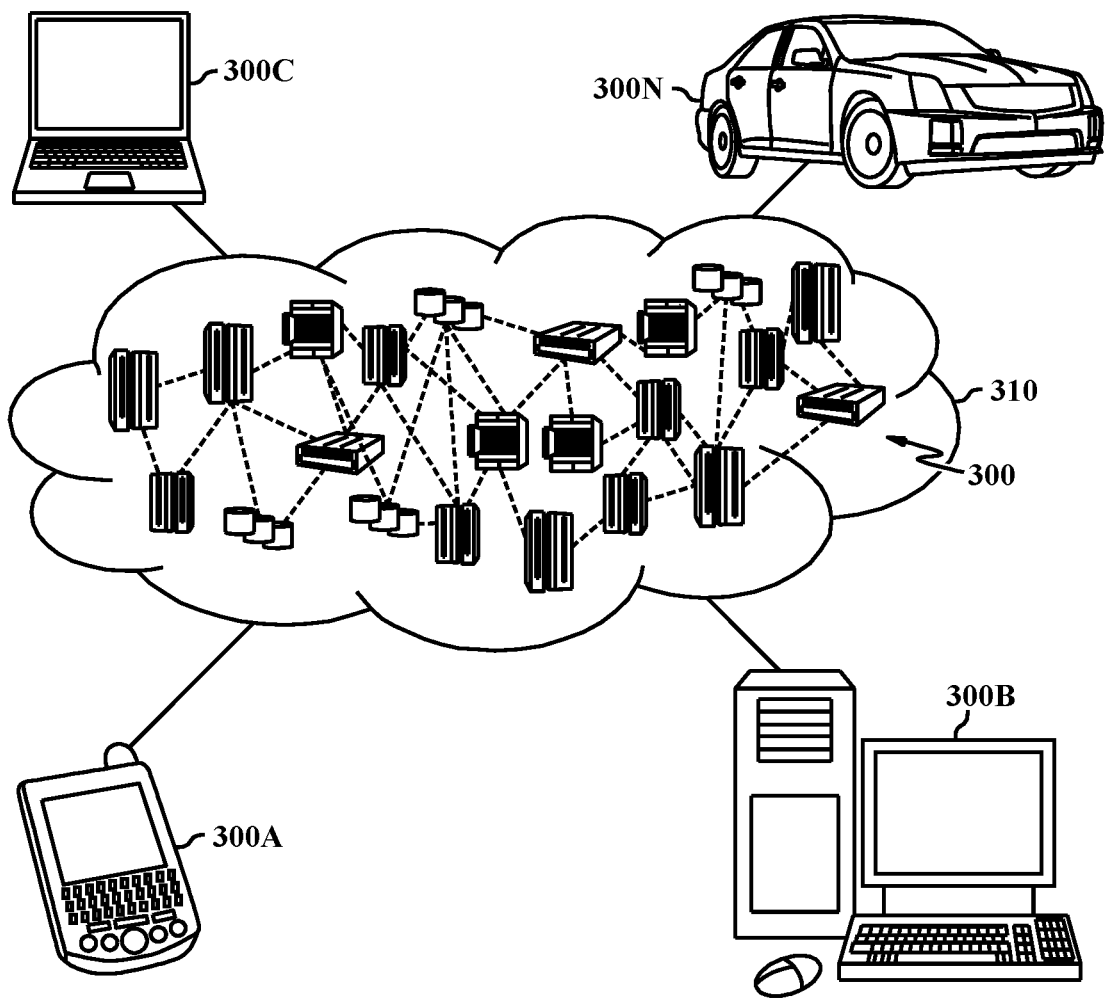
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
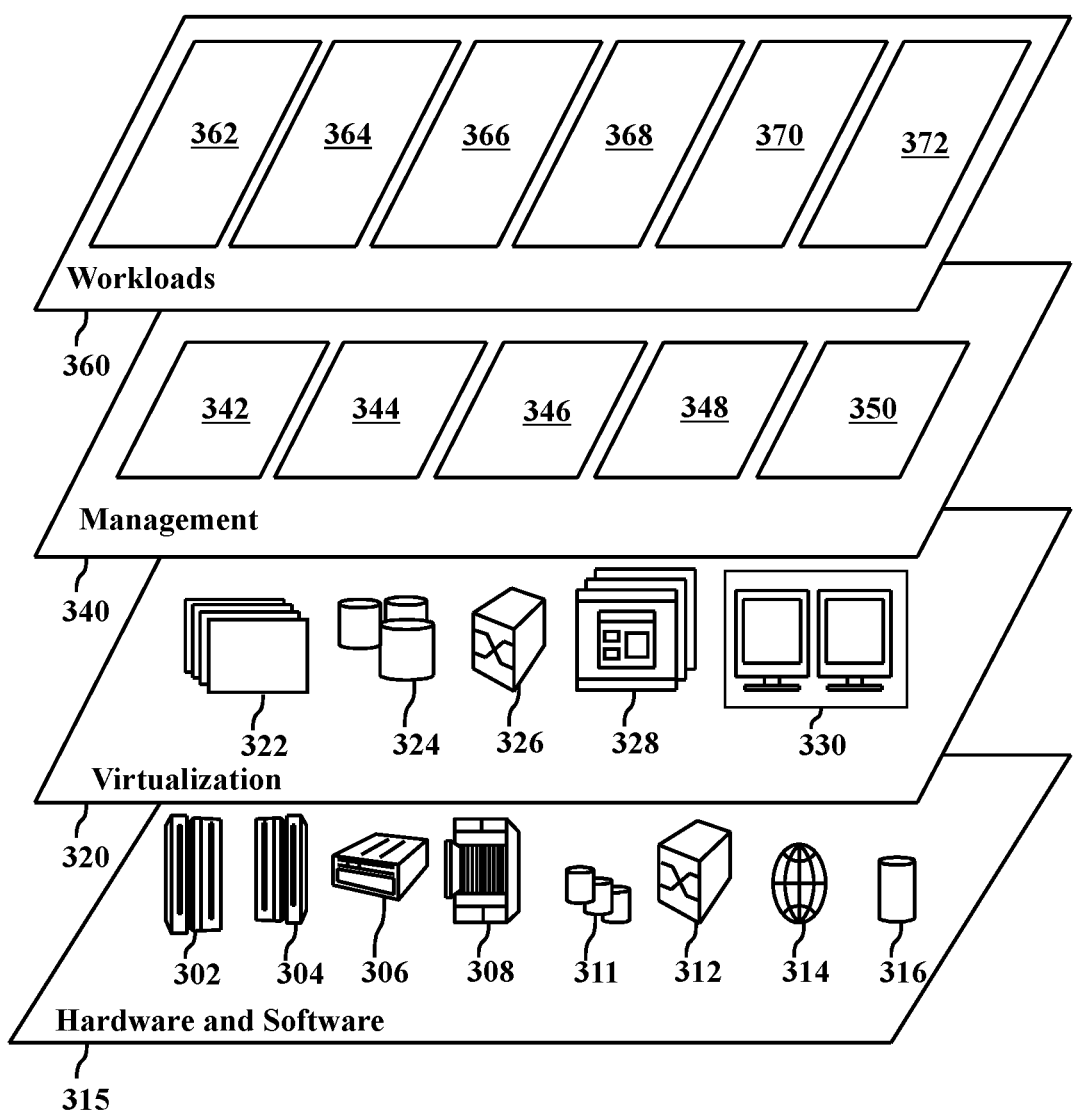
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and digital twin simulation of transportation of an object 372.

Figure 4:
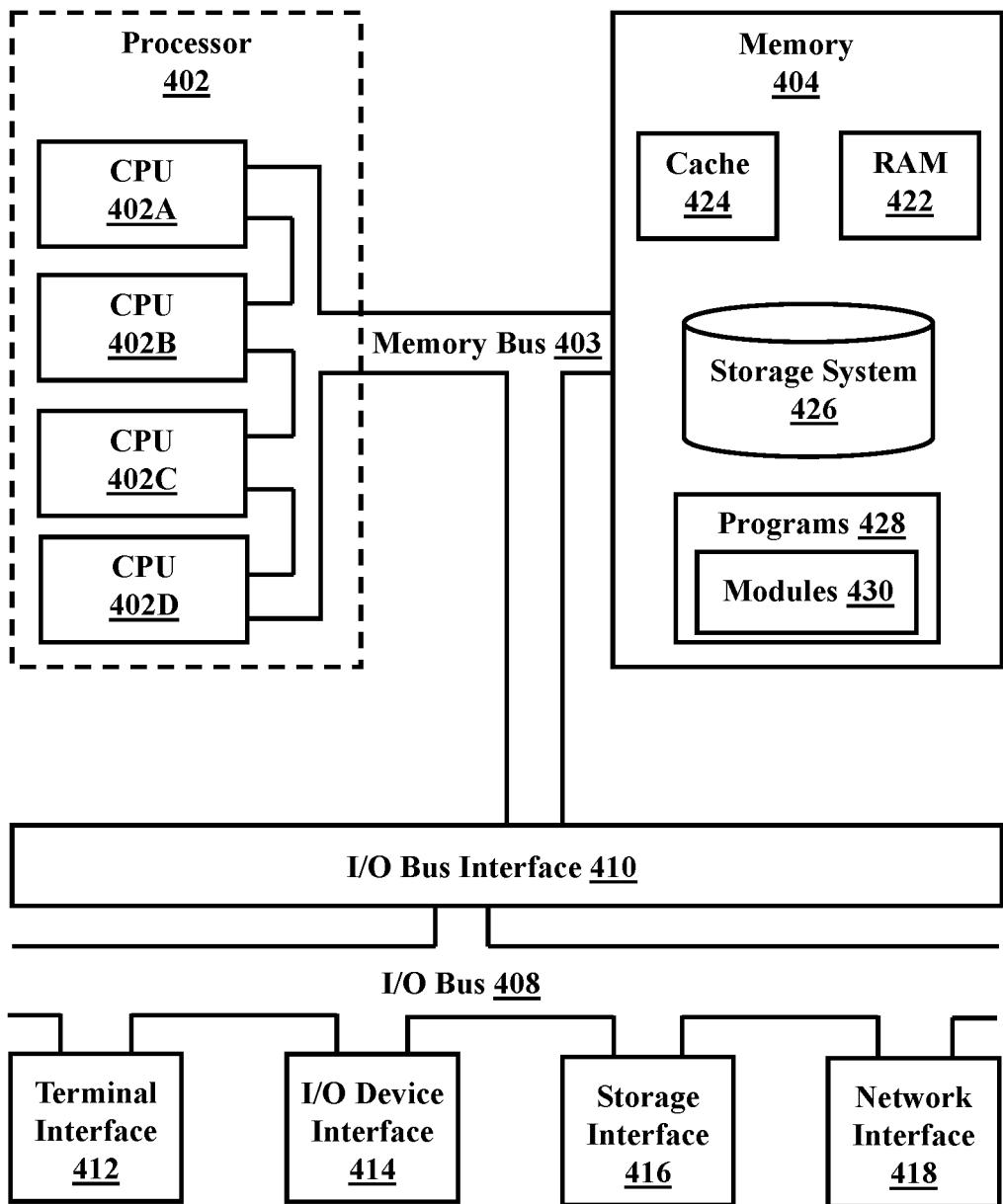
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer implemented method, the method comprising:
receiving, by a processor, first object data associated with a first object to be transported to a final destination, wherein the final destination includes a plurality of different routes having one or more different weather conditions;
receiving vehicle data associated with a plurality of potential vehicles for transportation of the first object, wherein the vehicle data includes one or more different capabilities for each of the plurality of potential vehicles;
receiving context data associated with a context for the transportation of the first object;
maintaining historical data obtained from a previous transportation of the first object in a database, wherein the first object data, the vehicle data, and the context data are based at least in part on the historic data maintained in the database;
simulating an outcome of the transportation of the first object utilizing each of the plurality of potential vehicles using digital twin simulation based on the first object data, the vehicle data and the context data;
identifying a first vehicle and a second vehicle of the plurality of potential vehicles for transportation of the first object based on an optimization of an optimization factor associated with the outcome of the digital twin simulation;
determining a first transportation route portion, having a first particular weather condition for the first vehicle of the transportation of the first object based on at least one capability of the one or more different capabilities of the first vehicle and the first particular weather condition, wherein the first transportation route portion ends at a partial destination of the final destination of the first object; and
determining a second transportation route portion having a second particular weather condition for a second vehicle of the transportation of the first object based on at least one capability of the one or more different capabilities of the second vehicle and the second particular weather condition, wherein the second transportation route portion includes a route from an originating location of the second vehicle to the partial destination and from the partial destination to the final destination, wherein the digital twin simulation uses machine learning to simulate a respective digital twin of each of the plurality of potential vehicles, wherein each of the respective digital twins represents a virtual representation of each of the plurality of potential vehicles, wherein the processor is located in a cloud node of a cloud computing environment comprising a plurality of cloud computing nodes and generates the optimization factor associated with the outcome of the digital twin simulation, wherein the processor generates the optimization factor associated with the outcome of the digital twin simulation includes:
analyzing the digital twin simulation for one or more transportation impacts; and
selecting at least one of the one or more transportation impacts on which to base the optimization factor, wherein the optimization factor is selected from at least one of:
transportation cost, transportation time, and damage to vehicle,
and further comprising:
sending, by the processor located in the cloud node of the cloud computing environment, a command to a processor of the first vehicle, wherein the processor of the first vehicle controls timing and route of the first vehicle; and
scheduling, based on the command, transportation of the first object by the first vehicle.

2. The method of claim 1, further comprising:
retrieving a previous digital twin simulation stored in a repository of simulations for a type of vehicle.

3. The method of claim 1, further comprising:
receiving second object data associated with a second object to be transported;
simulating transportation of the second object using the digital twin simulation, wherein the simulation is based on a combination of first constraints associated with the first object data and second constraints associated with the second object data; and
selecting the first vehicle based on a combined optimization factor, wherein the combined optimization factor combines the first constraints associated with the first object data and the second constraints associated with the second object data.

4. The method of claim 3, further comprising:
determining a first transportation route for the first object and a second transportation route for the second object based, at least in part, on the optimization of the optimization factor.

5. A system comprising:
a memory; and
a processor in communication with the memory, the processor being configured to perform operations comprising:
receiving first object data associated with a first object to be transported to a final destination, wherein the final destination includes a plurality of different routes having one or more different weather conditions;
receiving vehicle data associated with a plurality of potential vehicles for transportation of the first object, wherein the vehicle data includes one or more different capabilities for each of the plurality of potential vehicles;
receiving context data associated with a context for the transportation of the first object;
maintaining historical data obtained from a previous transportation of the first object in a database, wherein the first object data, the vehicle data, and the context data are based at least in part on the historic data maintained in the database;
simulating an outcome of the transportation of the first object utilizing each of the plurality of potential vehicles using digital twin simulation based on the first object data, the vehicle data and the context data;
identifying a first vehicle and a second vehicle of the plurality of potential vehicles for transportation of the first object based on an optimization of an optimization factor associated with the outcome of the digital twin simulation;
determining a first transportation route portion, having a first particular weather condition for the first vehicle of the transportation of the first object based on at least one capability of the one or more different capabilities of the first vehicle and the first particular weather condition, wherein the first transportation route portion ends at a partial destination of the final destination of the first object; and determining a second transportation route portion having a second particular weather condition for a second vehicle of the transportation of the first object based on at least one capability of the one or more different capabilities of the second vehicle and the second particular weather condition, wherein the second transportation route portion includes a route from an originating location of the second vehicle to the partial destination and from the partial destination to the final destination, wherein the digital twin simulation uses machine learning to simulate a respective digital twin of each of the plurality of potential vehicles, wherein each of the respective digital twins represents a virtual representation of each of the plurality of potential vehicles, wherein the processor is located in a cloud node of a cloud computing environment comprising a plurality of cloud computing nodes and generates the optimization factor associated with the outcome of the digital twin simulation, wherein the processor generates the optimization factor associated with the outcome of the digital twin simulation includes:

analyzing the digital twin simulation for one or more transportation impacts; and selecting at least one of the one or more transportation impacts on which to base the optimization factor, wherein the optimization factor is selected from at least one of: transportation cost, transportation time, and damage to vehicle, and the processor configured to perform further operations comprising:

sending, by the processor located in the cloud node of the cloud computing environment, a command to a processor of the first vehicle, wherein the processor of the first vehicle controls timing and route of the first vehicle; and scheduling, based on the command, transportation of the first object by the first vehicle.

6. The system of claim 5, further comprising:
retrieving a previous digital twin simulation stored in a repository of simulations for a type of vehicle.

7. The system of claim 5, the processor configured to perform further operations comprising:
receiving second object data associated with a second object to be transported;
simulating transportation of the second object using the digital twin simulation, wherein the simulation is based on a combination of first constraints associated with the first object data and second constraints associated with the second object data; and
selecting the first vehicle based on a combined optimization factor, wherein the combined optimization factor combines the first constraints associated with the first object data and the second constraints associated with the second object data.

8. The system of claim 7, the processor configured to perform further operations comprising:
determining a first transportation route for the first object and a second transportation route for the second object based, at least in part, on the optimization of the optimization factor.

9. A computer program product comprising a computer readable storage medium having program instructions embodied therewith, the program instructions executable by a processor to cause the processor to perform operations, the operations comprising:

receiving first object data associated with a first object to be transported to a final destination, wherein the final destination includes a plurality of different routes having one or more different weather conditions;

receiving vehicle data associated with a plurality of potential vehicles for transportation of the first object, wherein the vehicle data includes one or more different capabilities for each of the plurality of potential vehicles;

receiving context data associated with a context for the transportation of the first object;

maintaining historical data obtained from a previous transportation of the first object in a database, wherein the first object data, the vehicle data, and the context data are based at least in part on the historic data maintained in the database;

simulating an outcome of the transportation of the first object utilizing each of the plurality of potential vehicles using digital twin simulation based on the first object data, the vehicle data and the context data;

identifying a first vehicle and a second vehicle of the plurality of potential vehicles for transportation of the first object based on an optimization of an optimization factor associated with the outcome of the digital twin simulation;

determining a first transportation route portion, having a first particular weather condition for the first vehicle of the transportation of the first object based on at least one capability of the one or more different capabilities of the first vehicle and the first particular weather condition, wherein the first transportation route portion ends at a partial destination of the final destination of the first object; and determining a second transportation route portion having a second particular weather condition for a second vehicle of the transportation of the first object based on at least one capability of the one or more different capabilities of the second vehicle and the second particular weather condition, wherein the second transportation route portion includes a route from an originating location of the second vehicle to the partial destination and from the partial destination to the final destination, wherein the digital twin simulation uses machine learning to simulate a respective digital twin of each of the plurality of potential vehicles, wherein each of the respective digital twins represents a virtual representation of each of the plurality of potential vehicles, wherein the processor is located in a cloud node of a cloud computing environment comprising a plurality of cloud computing nodes and generates the optimization factor associated with the outcome of the digital twin simulation, wherein the processor generates the optimization factor associated with the outcome of the digital twin simulation includes:

analyzing the digital twin simulation for one or more transportation impacts; and selecting at least one of the one or more transportation impacts on which to base the optimization factor, wherein the optimization factor is selected from at least one of:

transportation cost, transportation time, and damage to vehicle, and the processor configured to perform further operations comprising:

sending, by the processor located in the cloud node of the cloud computing environment, a command to a processor of the first vehicle, wherein the processor of the first vehicle controls timing and route of the first vehicle; and scheduling, based on the command, transportation of the first object by the first vehicle.

10. The computer program product of claim 9, further comprising:

retrieving a previous digital twin simulation stored in a repository of simulations for a type of vehicle.

11. The computer program product of claim 9, the processor configured to perform further operations comprising:

receiving second object data associated with a second object to be transported;

simulating transportation of the second object using the digital twin simulation, wherein the simulation is based on a combination of first constraints associated with the first object data and second constraints associated with the second object data; and selecting the first vehicle based on a combined optimization factor, wherein the combined optimization factor combines the first constraints associated with the first object data and the second constraints associated with the second object data.

* * * * *